United States Patent
Hummel

(10) Patent No.: US 10,792,989 B2
(45) Date of Patent: Oct. 6, 2020

(54) HYBRID DRIVETRAIN FOR A HYBRID-DRIVE MOTOR VEHICLE

(71) Applicant: AUDI AG, Ingolstadt (DE)

(72) Inventor: Steffen Hummel, Flacht (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/341,657

(22) PCT Filed: Oct. 25, 2017

(86) PCT No.: PCT/EP2017/077219
§ 371 (c)(1),
(2) Date: Apr. 12, 2019

(87) PCT Pub. No.: WO2018/077911
PCT Pub. Date: May 3, 2018

(65) Prior Publication Data
US 2019/0263246 A1     Aug. 29, 2019

(30) Foreign Application Priority Data

Oct. 26, 2016   (DE) .......................... 10 2016 221 061

(51) Int. Cl.
*B60K 6/36* (2007.10)
*B60K 6/365* (2007.10)
(Continued)

(52) U.S. Cl.
CPC .................. *B60K 6/36* (2013.01); *B60K 6/48* (2013.01); *B60K 6/547* (2013.01); *F16H 3/006* (2013.01);
(Continued)

(58) Field of Classification Search
CPC ... B60K 6/36; B60K 6/38; B60K 6/40; B60K 6/547; B60K 6/365
See application file for complete search history.

(56) References Cited

U.S. PATENT DOCUMENTS

| | | | |
|---|---|---|---|
| 6,634,247 B2 * | 10/2003 | Pels .......................... | B60K 6/26 74/329 |
| 7,798,030 B2 * | 9/2010 | Lang ......................... | B60K 6/36 74/331 |
| 9,003,907 B2 * | 4/2015 | Weller ...................... | F16H 3/006 74/331 |

FOREIGN PATENT DOCUMENTS

| | | |
|---|---|---|
| DE | 19950679 A1 | 4/2001 |
| DE | 102004050757 A1 | 4/2006 |

(Continued)

OTHER PUBLICATIONS

International Preliminary Report on Patentability and translation of Written Opinion dated May 9, 2019 in corresponding International Application No. PCT/EP2017/077219; 9 pages.
(Continued)

*Primary Examiner* — Tisha D Lewis
(74) *Attorney, Agent, or Firm* — Maier & Maier, PLLC

(57) ABSTRACT

A hybrid drivetrain for a hybrid-drive vehicle, having a dual-clutch transmission, which can be shifted by shifting elements into different transmission steps, and which includes spur gearwheel sets which can be shifted via the shifting elements, and which form wheel levels, which are each associated with a first partial transmission and a second partial transmission, of which each partial transmission includes an input shaft, and the two partial transmissions comprise a common output shaft.

18 Claims, 1 Drawing Sheet

(51) Int. Cl.
*B60K 6/38* (2007.10)
*B60K 6/40* (2007.10)
*B60K 6/547* (2007.10)
*B60K 6/48* (2007.10)
*F16H 3/00* (2006.01)

(52) U.S. Cl.
CPC ............... *B60K 2006/4841* (2013.01); *F16H 2200/0043* (2013.01); *Y02T 10/62* (2013.01)

(56) References Cited

FOREIGN PATENT DOCUMENTS

| | | |
|---|---|---|
| DE | 102006036758 A1 | 2/2008 |
| DE | 102008031456 A1 | 1/2010 |
| DE | 102010030567 A1 | 12/2011 |
| DE | 102011101151 A1 | 12/2011 |
| DE | 102013005252 A1 | 10/2014 |
| DE | 102013206176 A1 | 10/2014 |
| DE | 102014013579 A1 | 3/2015 |
| DE | 102014210042 A1 | 12/2015 |
| EP | 2056391 A1 | 5/2009 |
| EP | 2204894 A1 | 7/2010 |
| EP | 2792523 A2 | 10/2014 |
| EP | 2808197 A1 | 12/2014 |
| GB | 2506601 A | 4/2014 |
| WO | 2010/047207 A1 | 4/2010 |
| WO | 2011/002921 A2 | 1/2011 |
| WO | 2014/166745 A1 | 10/2014 |
| WO | 2015/140617 A1 | 9/2015 |

OTHER PUBLICATIONS

German Search Report dated Jul. 14, 2017 in corresponding German Application No. 102016221061.0; 13 pages.
International Search Report dated Feb. 16, 2018 in corresponding International Application No. PCT/EP2017/077219; 21 pages.

* cited by examiner

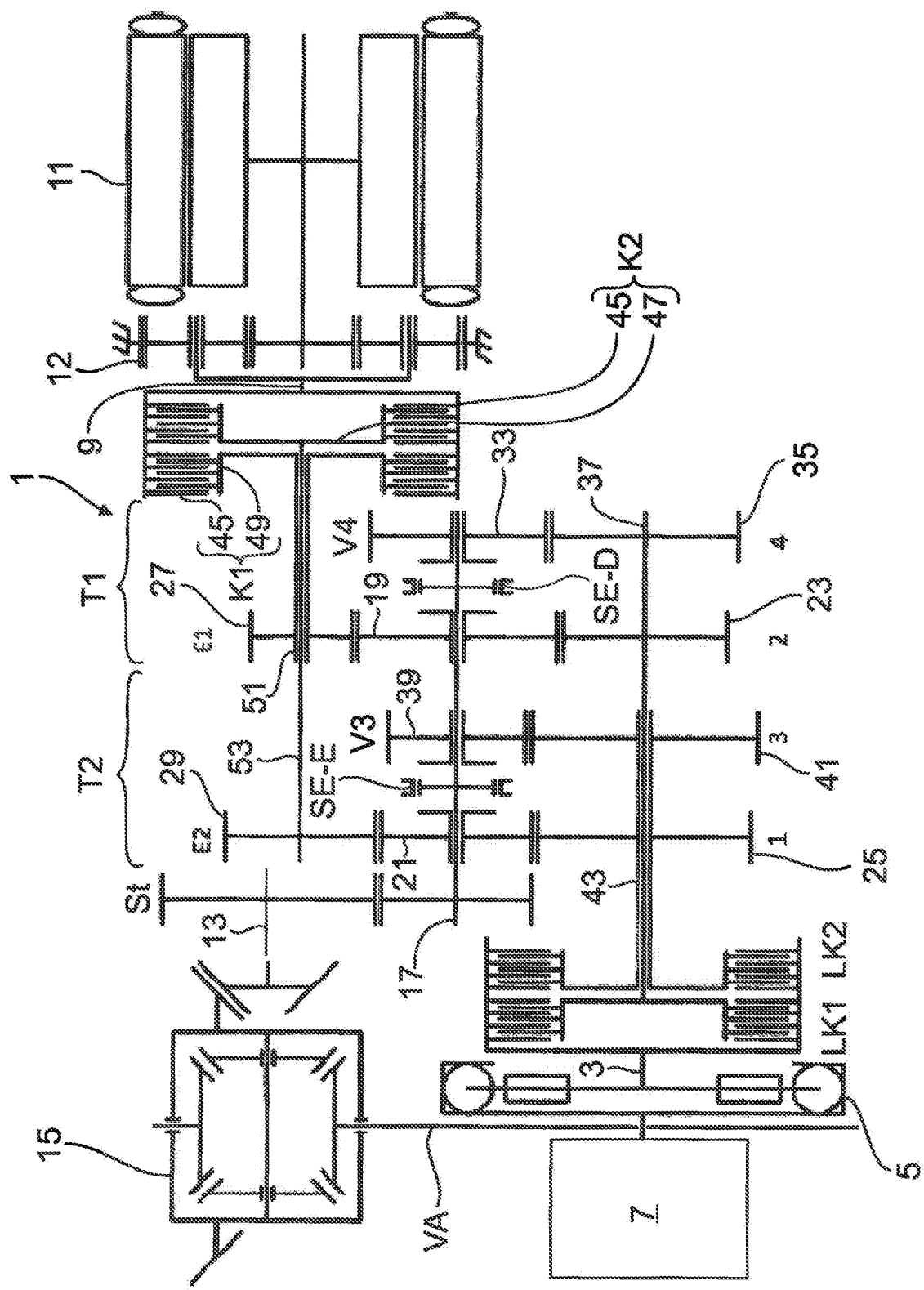

HYBRID DRIVETRAIN FOR A HYBRID-DRIVE MOTOR VEHICLE

FIELD

The disclosure relates to a hybrid drivetrain for a hybrid-drive motor vehicle.

BACKGROUND

A generic hybrid drivetrain for a hybrid-drive vehicle is known from DE 10 2014 013 579 A1. It comprises a dual-clutch transmission, which can be shifted by means of shifting elements into different transmission steps, and which comprises spur gearwheel sets which can be shifted via the shifting elements and which form wheel levels, which are each associated with a first partial transmission and a second partial transmission. Each partial transmission has a separate input shaft, wherein a common output shaft is associated with both partial transmissions. The two input shafts are arranged coaxially to one another and are each alternately connectable to an internal combustion engine shaft of an internal combustion engine via a powershift clutch. Moreover, an electric machine is connectable to the dual-clutch transmission by means of shifting elements.

SUMMARY

An object of the invention is to provide a hybrid drivetrain which has greater degrees of freedom in the functionality in a design which is structurally simple and favorable with respect to installation space in comparison to the prior art.

One of the wheel levels E1, V4 of the first partial transmission T1 is designed as a first hybrid wheel level E1. One wheel level E2, V3 of the second partial transmission T2 is designed as a second hybrid wheel level E2. The two hybrid wheel levels E1, E2 are each additionally connectable with respect to drive to one electric machine shaft of the electric machine by means of the shifting elements K1, K2, SE-E, SE-D.

In one technical implementation, the at least one of the hybrid wheel levels E1, E2 can be constructed from an output-side gearwheel arranged on the output shaft, a drive-side gearwheel arranged on the input shaft, and a gearwheel arranged on the electric machine shaft. The gearwheel arranged on the electric machine shaft can be rotationally mounted as a floating gearwheel on the electric machine shaft and can be decoupled from the electric machine shaft or can be coupled thereto by means of the shifting element K1, K2.

It is preferable if the electric machine shaft is entirely free of fixed gearwheels of the spur gearwheel sets arranged in a rotationally-fixed manner thereon, which form the wheel levels of the transmission.

Moreover, it is preferred if the transmission is designed solely as a spur gear transmission, in which the input shafts, the pinion shaft, the electric machine shaft, and the output shaft are exclusively connectable to one another with respect to drive via spur gearwheel sets. In this manner, a simply constructed transmission structure is achieved, which is operable substantially more efficiently than a planetary gear.

In one preferred embodiment, the respective hybrid wheel level E1, E2 can be arranged together with a further wheel level V3, V4 in the first and in the second partial transmission T1, T2. The above-mentioned further wheel level V3, V4 is, in contrast to the respective hybrid wheel level E1, E2, free of attachment in relation to the electric machine shaft and comprises an output-side floating gearwheel rotationally mounted on the pinion shaft, which can be coupled to the pinion shaft by means of a shifting element SE-D, SE-E. It is preferable if the shifting element SE-D, SE-E arranged on the pinion shaft can be shifted on both sides and is arranged in the axial direction between the output-side floating gearwheels, which are rotationally mounted on the pinion shaft, of the hybrid wheel level E1, E2 and the further wheel level V3, V4.

The above-mentioned further wheel level V3, V4 can moreover comprise a drive-side fixed gearwheel arranged on the respective input shaft.

The shifting element arranged on the electric machine shaft can be implemented arbitrarily, for example, as a powershift dual clutch. Moreover, the electric machine can be connected on the drive side or output side in the transmission. In the case of a drive-side connection, the electric-machine-side gearwheel of the hybrid wheel level E1, E2 can mesh with the drive-side fixed gearwheel arranged on the respective input shaft. In the case of an output-side connection, the electric-machine-side gearwheel of the hybrid wheel level E1, E2 can mesh with an output-side floating gearwheel of the hybrid wheel level E1, E2 rotatably mounted on the pinion shaft.

The advantageous embodiments and/or refinements of the invention explained above and/or reflected in the dependent claims can be used individually or also in any arbitrary combination with one another—except, for example, in the cases of unambiguous dependencies or alternatives which cannot be unified.

BRIEF DESCRIPTION OF THE DRAWINGS

The invention and its advantageous embodiments and refinements and the advantages thereof will be explained in greater detail hereafter on the basis of drawings.

FIG. 1 shows a hybrid drive train having a dual clutch transmission.

DETAILED DESCRIPTION

FIG. 1 shows a hybrid drivetrain having a dual-clutch transmission 1, which is designed by way of example as a 4-gear dual-clutch transmission. The hybrid drivetrain is part of a hybrid-drive motor vehicle (not shown). The dual-clutch transmission 1 can be shifted into different transmission steps by means of shifting elements and is constructed from spur gearwheel sets, which form the wheel levels E2, V3, E1, V4. The wheel levels E1, V4 are associated with a first partial transmission T1 and the wheel levels E2, V3 are associated with a second partial transmission T2. The two partial transmissions T1, T2 comprise a common pinion shaft 17. Each of the partial transmissions T1, T2 comprises a separate input shaft 37, 43. Of these, the first input shaft 37 is embodied as a solid shaft, which is guided coaxially through the second input shaft 43, which is formed as a hollow shaft. The two input shafts 37, 43 are each alternately connectable via a powershift clutch LK1, LK2 to an internal combustion engine shaft 3 connected to an internal combustion engine 7, in which a torsion damper 5 is integrated. In addition, an electric machine 11 is connectable to the dual-clutch transmission 1 by means of shifting elements K1, K2, SE-E, SE-D described hereafter.

The electric machine 11 can comprise a planetary reduction gear 12 shown in FIG. 1 for a torque conversion. Moreover, the transmission 1 is connected with respect to drive on the output side via an output shaft 13 to a front axle VA of the motor vehicle. The output shaft 13 is operationally connected as a pinion shaft to the bevel drive of a front axle differential 15.

As can furthermore be seen from FIG. 1, the internal combustion engine shaft 3, the electric machine shaft 9, and the interconnected pinion shaft 17 are arranged axially-parallel to one another. The pinion shaft 17, the electric machine shaft 9, and the output shaft 13 are connectable to one another with respect to drive via spur gearwheel sets, which can be shifted via the shifting elements. The spur gearwheel sets form the wheel levels E2, V3, E1, V4 arranged parallel to one another, which are all located in FIG. 1 in the axial direction between the internal combustion engine 7 and the electric machine 11.

The transmission structure of the dual-clutch transmission 1 shown in FIG. 1 is described hereafter: Thus, the first and second input shafts 37, 43 and the pinion shaft 17 are connectable to one another in FIG. 1 via the four wheel levels E2, V3, E1, V4, which are each constructed from floating and fixed gearwheels meshing with one another.

The total of four wheel levels E2, V3, E1, V4 comprise two hybrid wheel levels E1, E2. Each hybrid wheel level E1, E2 comprises an output-side floating gearwheel 19, 21 arranged on the pinion shaft 17, which meshes in each case with a drive-side fixed gearwheel 23, 25 arranged on the respective input shaft 37, 43 and with an electric-machine-side floating gearwheel 27, 29.

The two partial transmissions T1, T2 of the dual-clutch transmission 1 can—independently of one another—be shifted completely torque-free in transmission operation, i.e., can be completely decoupled from the drivetrain, so that either the first partial transmission T1 or the second partial transmission T2 is completely inoperative. The first hybrid wheel level E1 and a further, directly axially adjacent wheel level V4 are combined in the first partial transmission T1. The second hybrid wheel level E2 and a directly adjacent further wheel level V3 are combined in the second partial transmission T2.

The wheel level V4 arranged in the first partial transmission T1 comprises an output-side floating gearwheel 33 rotatably mounted on the pinion shaft 17. The output-side floating gearwheel 33 of the wheel level V4 and the output-side floating gearwheel 19 of the first hybrid wheel level E1 can be alternately coupled to the pinion shaft 17 via a shifting element SE-D, which is arranged therebetween and can be shifted on both sides. The wheel level V4 comprises a drive-side gearwheel 35, which is arranged as a fixed gearwheel on the first input shaft 37.

The second partial transmission T2 is constructed structurally equivalent to the first partial transmission T1. In the second partial transmission T2, the wheel level V3 comprises an output-side floating gearwheel 39 rotationally mounted on the pinion shaft 17. The output-side floating gearwheel 39 of the wheel level V3 and the output-side floating gearwheel 21 of the second hybrid wheel level E2 can be alternately coupled to the pinion shaft 17 via a shifting element SE-E, which is arranged therebetween and can be shifted on both sides. Both the second hybrid wheel level E2 and also the wheel level V3 comprise fixed gearwheels 25, 41 arranged in a rotationally-fixed manner on first input shaft 43.

As can furthermore be seen from FIG. 1, the two electric-machine-side gearwheels 27, 29, which are arranged coaxially to the electric machine shaft 9, of the hybrid wheel levels E1, E2 are shifted via a dual clutch, which is constructed from a first clutch K1 and a second clutch K2. The dual clutch has an outer plate support 45, which is connected in a rotationally-fixed manner to the electric machine shaft 9. The outer plate support 45 interacts with two inner plate supports 47, 49 arranged adjacent to one another in the axial direction. The inner plate support 49 is arranged together with the electric-machine-side gearwheel 27 of the first hybrid wheel level E1 in a rotationally-fixed manner on a hollow shaft 51. In contrast, the inner plate support 47 is arranged together with the electric-machine-side gearwheel 29 of the second hybrid wheel level E2 in a rotationally-fixed manner on a solid shaft 53, which extends coaxially through the hollow shaft 51.

The dual-clutch transmission 1 shown in FIG. 1 comprises a total of 12 gearwheels, two synchronizers, and four powershift clutches K1, K2, LK1, LK2 auf. Up to eight internal-combustion-engine gears can be shifted in the transmission 1, i.e., the four internal-combustion-engine direct gears VM1 to VM4 explained hereafter, which only use one wheel level, and four torsion gears VM5 to VM8, which use at least two wheel levels:

In the direct gears VM1 and VM3, the powershift clutch LK2 is closed, i.e., the partial transmission T2 is activated, and the shifting element SE-E is shifted to the left or shifted to the right, respectively, while the partial transmission T1 is inoperative. In the direct gears VM2 and VM4, the powershift clutch LK1 is closed, i.e., the partial transmission T1 is activated, and the shifting element SE-D is shifted to the left or shifted to the right, respectively, while the partial transmission T2 is inoperative.

Of the following four internal-combustion-engine torsion gears VM5 to VM8, in the gear VM5, the powershift clutches LK2, K1, and K2 are closed and the shifting element SE-D is shifted to the right. A load path thus results which extends from the second input shaft 43 via the second hybrid wheel level E2, the solid shaft 53, and the two closed clutches K1 and K2 to the first hybrid wheel level E1, and furthermore via the first input shaft 37 and the wheel level V4 to the pinion shaft 17. In the internal-combustion-engine torsion gear VM6, the shifting elements are shifted identically, with the exception that the shifting element SE-D is shifted to the left.

In the internal-combustion-engine torsion gear VM7, the powershift clutches LK1, K1, and K2 are closed and the shifting element SE-E is shifted to the right. A load path thus results which extends from the first input shaft 37 via the first hybrid wheel level E1, the hollow shaft 51, and the two closed clutches K1 and K2 to the second hybrid wheel level E2 and furthermore via the second input shaft 43 and the wheel level V3 to the pinion shaft 17. In the internal-combustion-engine torsion gear VM8, the shifting elements are shifted identically, with the exception that the shifting element SE-E is shifted to the left.

In the solely electromotive operation of the transmission 1 shown in FIG. 1, the following two direct gears EM1, EM2 and the two torsion gears EM3 and EM4 can be shifted:

Thus, in the direct gear EM1, the clutch K1 is actuated and the shifting element SE-D is shifted to the left. In the direct gear EM2, the clutch K2 is actuated and the shifting element SE-E is shifted to the left. In the electromotive torsion gear EM3, the clutch K1 is actuated and SE-D is shifted to the right. In the torsion gear EM4, the clutch K2 is actuated and SE-E it is shifted to the right.

As can be seen from the above description, the internal-combustion-engine torsion gears can be generated in that the two electric-machine-side clutches K1, K2 are closed. The electromotive torsion gears, in contrast, can be generated in that in each case one of the shifting elements SE-E and SE-D arranged on the pinion shaft 17 is actuated to the right.

From the above internal-combustion-engine gears VM1 to VM8 and the electromotive gears EM1 to EM4, hybrid gears can be implemented in combination, in which electromotive and internal-combustion-engine gears are shifted in combination. A driving situation is described hereafter by way of example, in which the internal-combustion-engine direct gear VM2 or VM4 is engaged. In this case, the electric machine 11 can be connected to the transmission in the following four different connection variants:

In in a first connection variant, the powershift clutch K2 is closed and the shifting element SE-E it is actuated to the left. The electric machine 11 thus outputs via the hybrid wheel level E2 onto the pinion shaft 17 while forming a direct gear.

In a second connection variant, the powershift clutch K2 is closed and the shifting element SE-E is actuated to the right. A load path thus results which extends from the electric machine 11 via the solid shaft 53, the second hybrid wheel level E2, the second input shaft 43, the wheel level V3, and the shifting element SE-E to the pinion shaft 17. The electric machine 11 therefore outputs onto the pinion shaft 17 while forming a torsion gear.

In a third connection variant, the powershift clutch K1 is closed. A load path thus results which extends from the electric machine 11 via the hollow shaft 51 and the first hybrid wheel level E1 to the pinion shaft 17.

In a fourth connection variant—in addition to the already closed clutch LK1—the clutches LK2 and K2 are closed. A load path thus results which extends from the electric machine 11 via the solid shaft 53, the second hybrid wheel level E2, and the two closed clutches LK2 and LK1 to the first input shaft 37.

Moreover, stationary charging of the electric machine 11 is enabled using the transmission structure shown in FIG. 1, if the vehicle is at a vehicle standstill, for example, at a traffic signal or in a traffic jam. In addition, an internal combustion engine start can be carried out with the aid of the electric machine 11. The electric machine 11 can start the internal combustion engine 7 via a load path in which, for example, the second clutch K2 (consisting of the outer plate support 45 and the inner plate support 47) is closed and also only the powershift clutch LK2 is closed.

The invention claimed is:

1. A hybrid drivetrain for a hybrid-drive vehicle, comprising:
a dual-clutch transmission, which can be shifted by shifting elements into different transmission steps, and which further comprises spur gearwheel sets which can be shifted via the shifting elements and which form wheel levels, which are each associated with a first partial transmission and a second partial transmission, of which each partial transmission further comprises an input shaft, and the two partial transmissions comprise a common pinion shaft, wherein the two input shafts are arranged coaxially to one another and are each alternately connectable via a powershift clutch to an internal combustion engine shaft of an internal combustion engine, and wherein an electric machine is connectable to the dual-clutch transmission by the shifting elements, wherein one of the wheel levels of the first partial transmission is designed as a first hybrid wheel level and one of the wheel levels of the second partial transmission is designed as a second hybrid wheel level, and the first and second hybrid wheel levels are each additionally drivably connectable by the shifting elements to an electric machine shaft of the electric machine;
wherein the pinion shaft is connected via a spur gear step to an output shaft, and in particular all wheel levels are arranged in the axial direction between the spur gear step and the electric machine.

2. The drivetrain as claimed in claim 1, wherein at least one of the hybrid wheel levels comprises an output-side gearwheel arranged on the pinion shaft, a drive-side gearwheel arranged on the respective input shaft, and an electric-machine-side gearwheel, and the electric-machine-side gearwheel is designed as a floating gearwheel and can be decoupled from the electric machine shaft or can be coupled thereto by the shifting element.

3. The drivetrain as claimed in claim 1, wherein the electric machine shaft and the pinion shaft is free of fixed gearwheels arranged in a rotationally-fixed manner thereon of the spur gearwheel sets forming the wheel levels.

4. The drivetrain as claimed in claim 2, wherein the output-side gearwheel of the hybrid wheel level arranged on the pinion shaft is a floating gearwheel, which can be coupled by a shifting element to the pinion shaft, and the drive-side gearwheel of the hybrid wheel level arranged on the input shaft is a fixed gearwheel.

5. The drivetrain as claimed in claim 1, wherein a further wheel level, which is free of connections with respect to the electric machine shaft, directly adjoins the hybrid wheel level of the partial transmission, and in particular the further wheel level comprises an output-side floating gearwheel, which is rotationally mounted on the pinion shaft and can be coupled by a shifting element to the pinion shaft, and in particular the shifting element arranged on the pinion shaft can be shifted on both sides and is arranged in the axial direction between an output-side floating gearwheel of the hybrid wheel level, which gearwheel is rotationally mounted on the pinion shaft, and the further wheel level, wherein the shifting element is decoupled in a neutral position from the hybrid wheel level and from the further wheel level and the shifting element either couples the output-side floating gearwheel of the further wheel level to the pinion shaft in a first shift position or couples the output-side floating gearwheel of the hybrid wheel level to the pinion shaft in a second shift position.

6. The drivetrain as claimed in claim 5, wherein in the partial transmission, the further wheel level comprises a drive-side fixed gearwheel arranged on the input shaft.

7. The drivetrain as claimed in claim 1, wherein the electric machine is connected on an output side, and for the output-side connection of the electric machine, an electric-machine-side gearwheel of the hybrid wheel level meshes with an output-side floating gearwheel rotationally mounted on the pinion shaft.

8. The drivetrain as claimed in claim 1, wherein the electric machine is connected on a drive side, and for the drive-side connection of the electric machine, an electric-machine-side gearwheel of the hybrid wheel level meshes with the drive-side fixed gearwheel arranged on the input shaft.

9. The drivetrain as claimed in claim 2, wherein the electric machine shaft and/or the pinion shaft is free of fixed gearwheels arranged in a rotationally-fixed manner thereon of the spur gearwheel sets forming the wheel levels.

10. The drivetrain as claimed in claim 2, wherein the pinion shaft is connected via a spur gear step to an output shaft, and in particular all wheel levels are arranged in the axial direction between the spur gear step and the electric machine.

11. The drivetrain as claimed in claim 3, wherein the pinion shaft is connected via a spur gear step to an output shaft, and in particular all wheel levels are arranged in the axial direction between the spur gear step and the electric machine.

12. The drivetrain as claimed in claim 3, wherein an output-side gearwheel of the hybrid wheel level arranged on the pinion shaft is a floating gearwheel, which can be coupled by a shifting element to the pinion shaft, and/or the drive-side gearwheel of the hybrid wheel level arranged on the input shaft is a fixed gearwheel.

13. The drivetrain as claimed in claim 1, wherein an output-side gearwheel of the hybrid wheel level arranged on the pinion shaft is a floating gearwheel, which can be coupled by a shifting element to the pinion shaft, and/or the drive-side gearwheel of the hybrid wheel level arranged on the input shaft is a fixed gearwheel.

14. The drivetrain as claimed in claim 2, wherein a further wheel level, which is free of connections with respect to the electric machine shaft, directly adjoins the hybrid wheel level of the partial transmission, and in particular the further wheel level comprises an output-side floating gearwheel, which is rotationally mounted on the pinion shaft and can be coupled by a shifting element to the pinion shaft, and in particular the shifting element arranged on the pinion shaft can be shifted on both sides and is arranged in the axial direction between an output-side floating gearwheel of the hybrid wheel level, which gearwheel is rotationally mounted on the pinion shaft, and the further wheel level, wherein the shifting element is decoupled in a neutral position from the hybrid wheel level and from the further wheel level and the shifting element either couples the output-side floating gearwheel of the further wheel level to the pinion shaft in a first shift position or couples the output-side floating gearwheel of the hybrid wheel level to the pinion shaft in a second shift position.

15. The drivetrain as claimed in claim 3, wherein a further wheel level, which is free of connections with respect to the electric machine shaft, directly adjoins the hybrid wheel level of the partial transmission, and in particular the further wheel level comprises an output-side floating gearwheel, which is rotationally mounted on the pinion shaft and can be coupled by a shifting element to the pinion shaft, and in particular the shifting element arranged on the pinion shaft can be shifted on both sides and is arranged in the axial direction between an output-side floating gearwheel of the hybrid wheel level, which gearwheel is rotationally mounted on the pinion shaft, and the further wheel level, wherein the shifting element is decoupled in a neutral position from the hybrid wheel level and from the further wheel level and the shifting element either couples the output-side floating gearwheel of the further wheel level to the pinion shaft in a first shift position or couples the output-side floating gearwheel of the hybrid wheel level to the pinion shaft in a second shift position.

16. The drivetrain as claimed in claim 4, wherein a further wheel level, which is free of connections with respect to the electric machine shaft, directly adjoins the hybrid wheel level of the partial transmission, and in particular the further wheel level comprises an output-side floating gearwheel, which is rotationally mounted on the pinion shaft and can be coupled by a shifting element to the pinion shaft, and in particular the shifting element arranged on the pinion shaft can be shifted on both sides and is arranged in the axial direction between the output-side floating gearwheel of the hybrid wheel level, which gearwheel is rotationally mounted on the pinion shaft, and the further wheel level, wherein the shifting element is decoupled in a neutral position from the hybrid wheel level and from the further wheel level and the shifting element either couples the output-side floating gearwheel of the further wheel level to the pinion shaft in a first shift position or couples the output-side floating gearwheel of the hybrid wheel level to the pinion shaft in a second shift position.

17. The drivetrain as claimed in claim 2, wherein the electric machine is connected on the output side, and for the output-side connection of the electric machine, the electric-machine-side gearwheel of the hybrid wheel level meshes with the output-side floating gearwheel rotationally mounted on the pinion shaft.

18. The drivetrain as claimed in claim 3, wherein the electric machine is connected on the output side, and for the output-side connection of the electric machine, the electric-machine-side gearwheel of the hybrid wheel level meshes with the output-side floating gearwheel rotationally mounted on the pinion shaft.

* * * * *